United States Patent
Hellenthal et al.

(10) Patent No.: US 9,053,645 B2
(45) Date of Patent: Jun. 9, 2015

(54) SUSPENSION DEVICE FOR SCREENS

(75) Inventors: Gregor Hellenthal, Hennef (DE); Ralph Rudolf Hache, Neunkirchen-Seelscheid (DE)

(73) Assignee: Exact Planwerk GmbH (DE)

( * ) Notice: Subject to any disclaimer, the term of this patent is extended or adjusted under 35 U.S.C. 154(b) by 652 days.

(21) Appl. No.: 13/318,711

(22) PCT Filed: May 3, 2010

(86) PCT No.: PCT/EP2010/055983
§ 371 (c)(1),
(2), (4) Date: Nov. 3, 2011

(87) PCT Pub. No.: WO2010/128018
PCT Pub. Date: Nov. 11, 2010

(65) Prior Publication Data
US 2012/0050137 A1 Mar. 1, 2012

(30) Foreign Application Priority Data
May 6, 2009 (DE) ...................... 20 2009 006 585 U

(51) Int. Cl.
*A47G 5/00* (2006.01)
*G09G 5/00* (2006.01)
(Continued)

(52) U.S. Cl.
CPC .. *G09F 7/18* (2013.01); *G09G 5/00* (2013.01); *G03B 21/56* (2013.01); *F16M 13/02* (2013.01); *G09F 9/30* (2013.01); *H04N 5/655* (2013.01)

(58) Field of Classification Search
CPC .......... A47G 5/00; G03B 21/56; G03B 21/58; G03B 21/60; G09G 5/00
USPC ......... 160/371, 377, 379, 369, 353, 351, 184, 160/181, 135; 248/200, 300, 27.1, 906, 248/917; 345/1.3; 348/839, 840; 359/443, 359/450; 40/489; 52/36.1, 483.1, 239
See application file for complete search history.

(56) References Cited

U.S. PATENT DOCUMENTS 2,293,431 A * 8/1942 Frease .......................... 52/475.1
5,220,952 A * 6/1993 Beaulieu .................... 160/231.1
(Continued)

FOREIGN PATENT DOCUMENTS

DE 102006025724 B3 11/2007
GB 2203586 A 10/1988
(Continued)

OTHER PUBLICATIONS

International Search Report and Written Opinion, PCT/EP2010/055983, dated Jul. 28, 2010.

*Primary Examiner* — Katherine Mitchell
*Assistant Examiner* — Jeremy Ramsey
(74) *Attorney, Agent, or Firm* — Lerner, David, Littenberg, Krumholz Mentlik, LLP

(57) ABSTRACT

The suspension device for screens having a rectangular screen format comprises at least one substantially square frame element having a holder for the screen. The frame element is fastened to a supporting wall or to a stand. A corresponding screen wall having at least two screens is formed by a suspension device which interconnects the screens and which has a stand, which comprises at least one base and at least one stand element supported by the base, wherein the base and the stand element support a frame element, a spacer element and/or a support element. By exactly positioning the frame elements and the spacer elements, for example on a supporting wall, a stable suspension device for an entire screen wall can be formed. The respective screens only need to be suspended in the related holders in such a suspension device.

21 Claims, 7 Drawing Sheets

Figure 1:
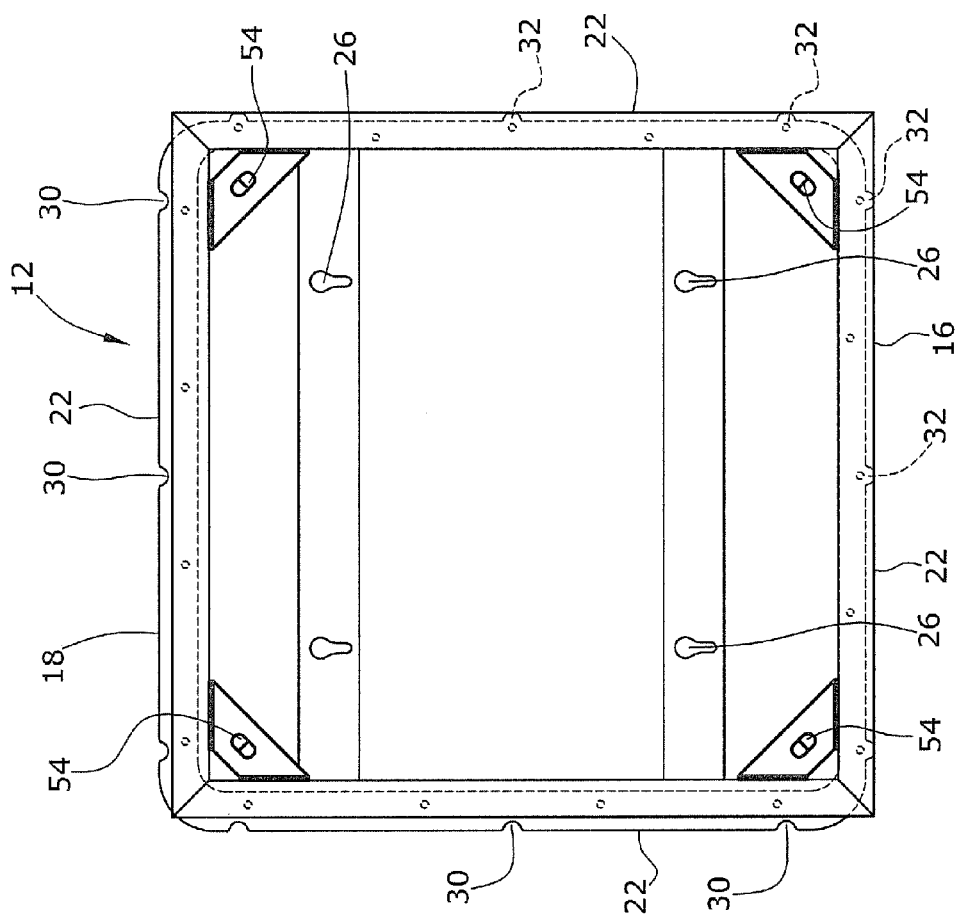

(51) Int. Cl.
*G09F 7/18* (2006.01)
*F16M 13/02* (2006.01)
*G09F 9/30* (2006.01)
*G03B 21/56* (2006.01)
*H04N 5/655* (2006.01)

(56) References Cited

U.S. PATENT DOCUMENTS

| | | | | |
|---|---|---|---|---|
| 5,375,641 A | * | 12/1994 | Schlueter | 160/135 |
| 5,512,968 A | * | 4/1996 | Hagiwara et al. | 353/94 |
| 5,523,790 A | | 6/1996 | Kalua | |
| 5,579,621 A | * | 12/1996 | Fang | 52/483.1 |
| 6,550,521 B1 | | 4/2003 | McNabb | |
| 6,813,853 B1 | * | 11/2004 | Tucker | 40/448 |
| 7,277,066 B2 | * | 10/2007 | Sundahl | 345/1.3 |
| 7,466,482 B2 | * | 12/2008 | Liao | 359/443 |
| 8,384,616 B2 | * | 2/2013 | Elliott et al. | 345/1.3 |
| 2006/0266898 A1 | | 11/2006 | Lin | |
| 2007/0153138 A1 | | 7/2007 | Levy | |
| 2007/0205340 A1 | * | 9/2007 | Jung | 248/125.9 |
| 2009/0225506 A1 | * | 9/2009 | Lee et al. | 361/679.21 |
| 2011/0084892 A1 | * | 4/2011 | Han et al. | 345/1.3 |
| 2011/0304523 A1 | * | 12/2011 | Adema et al. | 345/1.3 |

FOREIGN PATENT DOCUMENTS

JP 05-056375 A 3/1993
JP 2006-287562 A 10/2006

\* cited by examiner

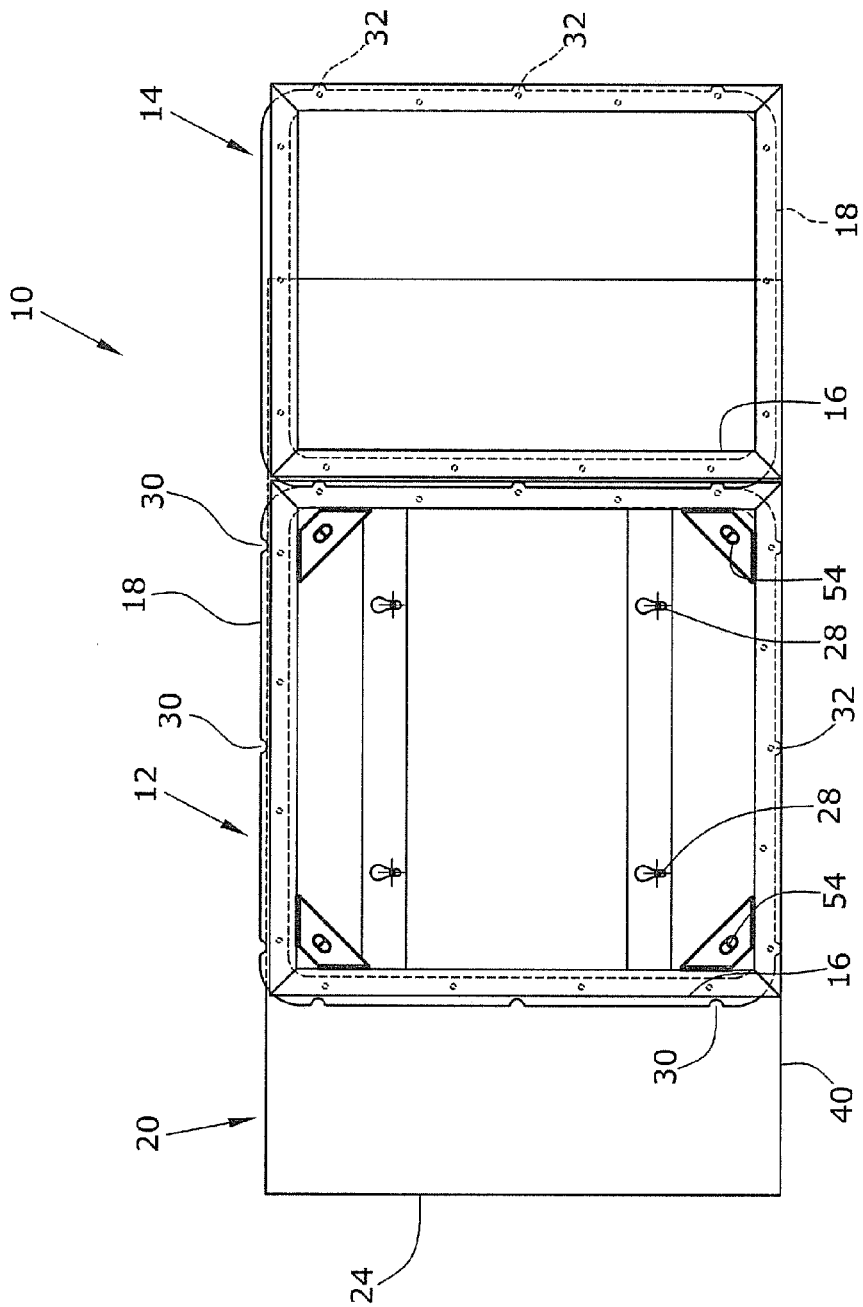
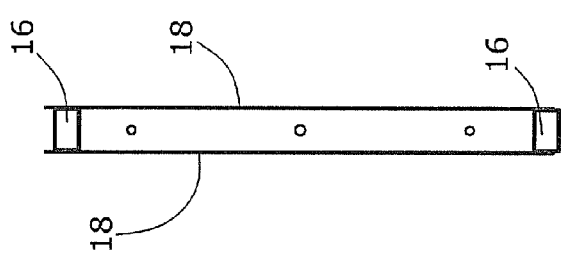

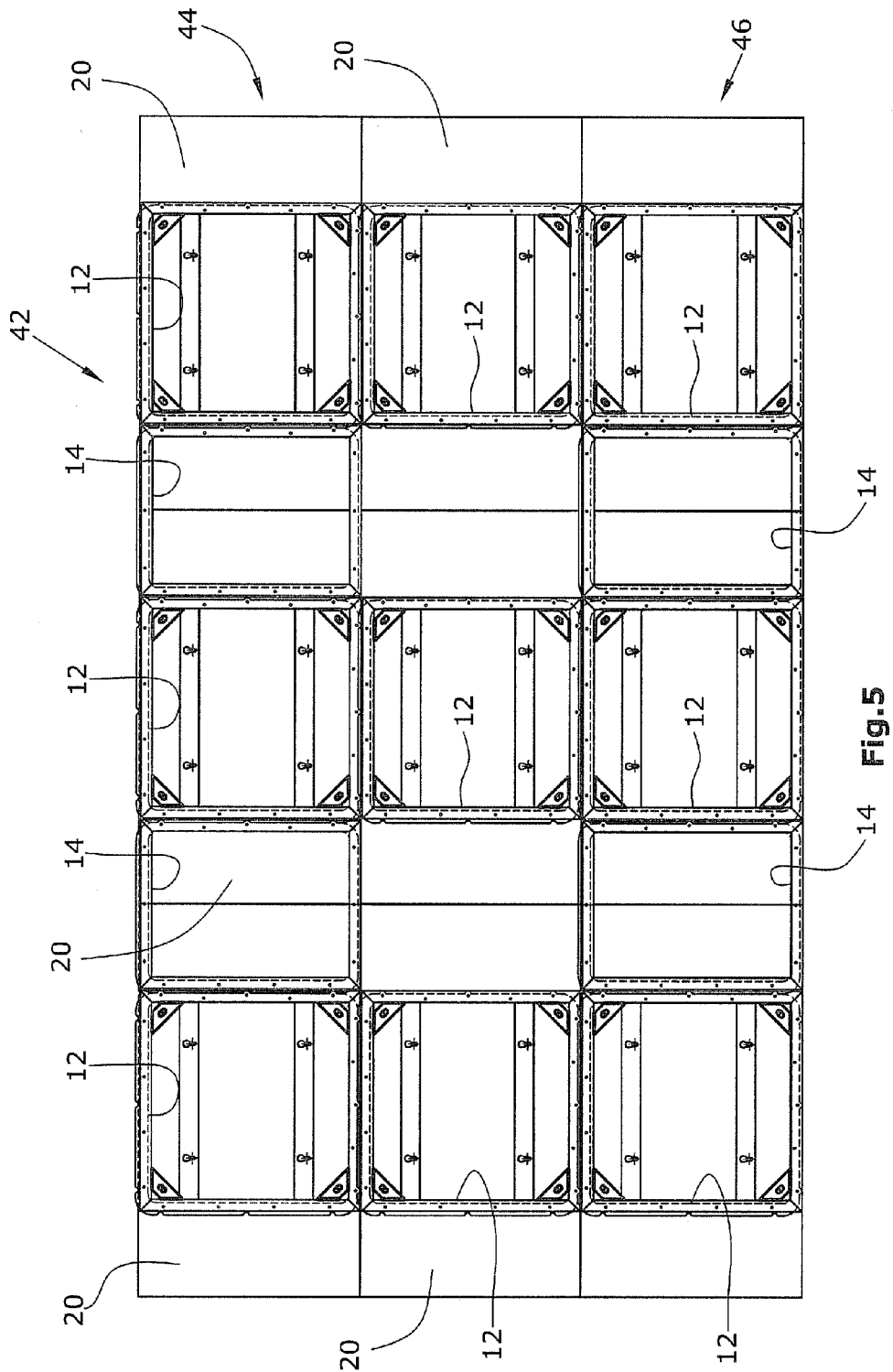

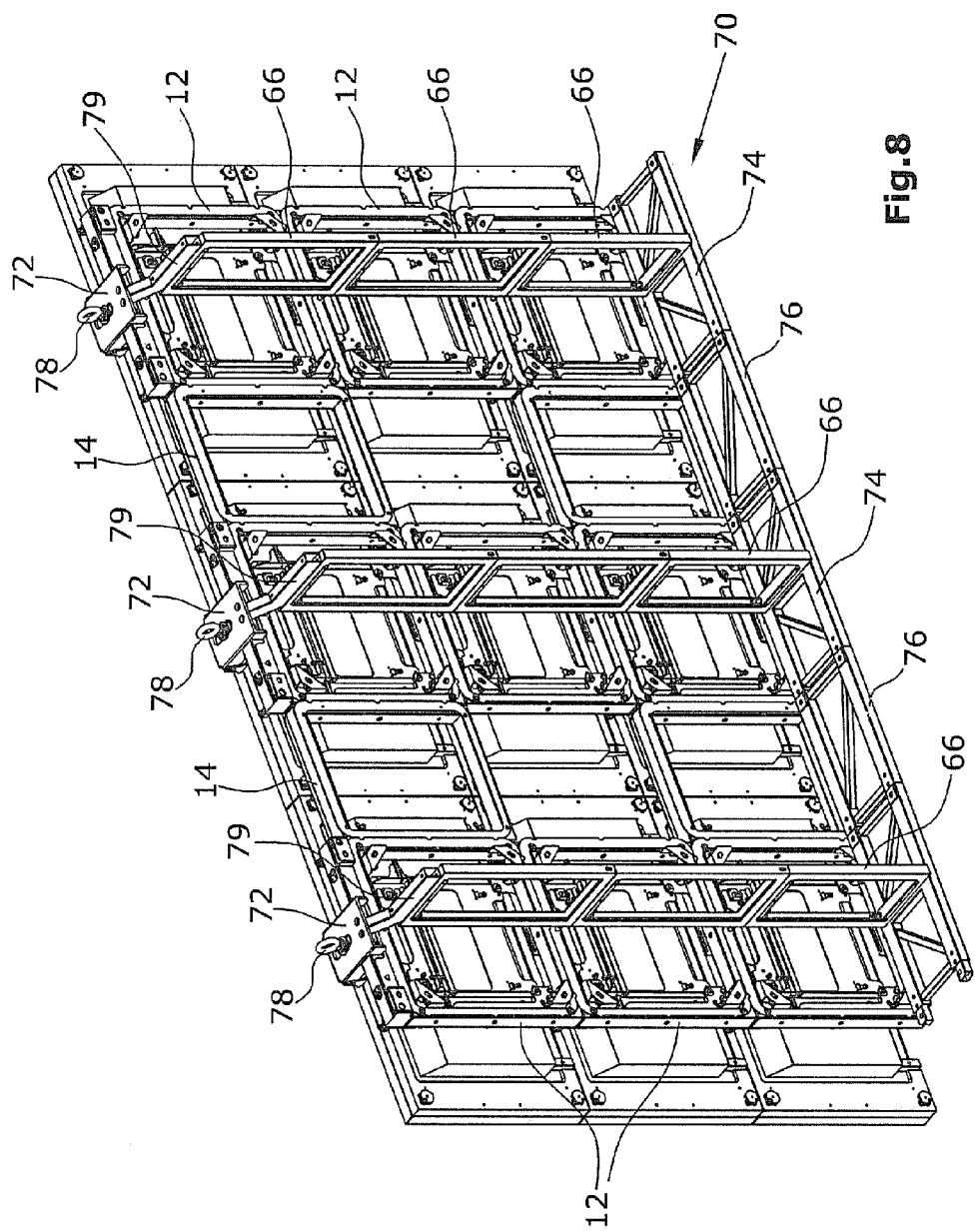

SUSPENSION DEVICE FOR SCREENS

CROSS REFERENCE TO RELATED APPLICATIONS

The present application is a national phase entry under 35 USC §371 of International Application No. PCT/EP2010/055983, filed May 3, 2010, which claims the benefit of and priority to German Patent Application No. 20 2009 006 585.5, filed May 6, 2009, the entire disclosures of which are incorporated herein by reference.

The invention relates to a suspension device for at least one screen with rectangular screen format, and to corresponding screen wall.

The term "screen wall" is to be understood as denoting a plurality of screens arranged vertically above each other and/or horizontally adjacent to each other in the manner of a video wall. Such screen walls are used e.g. for presentation purposes on trade fairs, wherein, frequently, the individual screens shall not each display the same image but instead are assembled to form one large combined screen for display of a sole image. In such a combinatory arrangement, it is desirable to keep the distances between neighboring screens as small as possible so that the effect of a resulting total image will not be unnecessarily impaired.

Up to now, screens in screen walls were supported by respective frames fixedly connected to the screens. For forming a screen wall, the frames connected to the screens each have to be fastened to a support wall. In the process of exactly adjusting the frames relative to each other for generating equal distances between the screens, difficulties are encountered. When a screen wall is to be assembled or disassembled or when an existing screen wall is to be reconfigured, each frame must be mounted and adjusted together with the screen.

It is an object of the invention to provide a light-weighted, easily mounted suspension device for at least one screen having a rectangular screen format. Also, there shall be provided a corresponding screen wall comprising at least two screens and comprising a suspension device for connection of the screens to each other.

The suspension device according to the invention is defined by the features indicated in claim 1. The screen wall according to the invention is defined by the features of claim 11.

According to claim 1, the suspension device comprises at least one frame element having a substantially square shape when seen in front view, with the length of the outer edges substantially corresponding to the length of the shorter edge of the rectangular image format. The frame element comprises a receiving means, preferably in the form of a suspension means, for the screen.

The screen will be attached by its rear side to the frame element. Due to the square outer shape whose edge length corresponds to that of the shorter edge of the image format, the frame element does not substantially extend beyond the outer dimensions of the screen casing but is flush with the two longer edges of the screen casing. Relative to the two shorter edges, the frame element is set back to a position behind the screen housing. As a result, adjacent screens can be connected to each other while their edges are adjoining each other, for thus forming a screen wall. In this arrangement, the frame elements have at least one outer edge designed for attachment of at least one further, identical frame element. In the front view onto the screens, the screen casings are immediately adjoining each other, without the size of the gap between adjacent screens being unnecessarily enlarged by the frame element. Further, the frame element is smaller than previous supporting frames and thus has a lower weight. For mounting a screen or a screen wall, the frame will first be fastened to a supporting wall or a stand, e.g. by screw-type attachment. Then, the respective screen can be hung into the receiving means in a simple manner. The advantage achieved by the invention resides in that the screen does not need to be screwed onto a wall together with its supporting frame but that the suspension device makes it possible in a simple manner to hang up the screen e.g. on a wall, thus facilitating the mounting process.

Preferably, the suspension device comprises a spacer element which on two mutually opposite sides is respectively configured for attachment to an outer edge of at least one frame element. Said spacer element serves for mutual connection of at least two frame elements so as to form a rigid supporting frame for a screen wall assembled of at least two screens. The spacer element will be fastened to that outer edge of the respective frame element which is covered by a suspended screen. The spacer element, when seen in front view, preferably has a substantially rectangular outer shape, wherein the lengths of two mutually opposite edges substantially correspond to the shorter edge of the image format. The edges whose lengths correspond to the length of the image format are the connecting edges for connection to the frame element. The two other edges of the spacer element preferably have such a length that the screens of two frame elements interconnected by the spacer element are adjoining each other except for a small distance of a few millimeters and preferably less than 1 mm. This is achieved if the length of these edges is slightly larger than the difference between the length of the longer image format edge and the length of one of the outer frame element edges.

By use of a suspension device formed of frame elements and spacer elements in the above outlined manner, it is rendered possible to hang up screens in such a mutually adjacent arrangement in the vertical and horizontal directions that both the short screen edge and the long screen edges are adjoining each other except for a slight distance. Herein, by exact positioning of the frame elements and of the spacer elements, e.g. on a supporting wall, there can be formed a stable suspension device for a complete screen wall. In such a suspension device, the respective screens merely have to be hung into the appertaining receiving means.

The receiving means for the screens is preferably formed as an opening for complementary pins on the rear side of the screen casing. Preferably, the receiving means for holding the screen should be formed in horizontal or vertical orientation, so that the screen can be received selectively in horizontal or vertical orientation without rotating the frame element. Thereby, screen walls having rectangular image formats, e.g. the 16:9 or the 4:3 image format, can be formed from screens selectively arranged in upright or transverse orientation. In case of screens in upright orientation, the frame elements will be connected to each other vertically on top of each other by means of spacer elements. In case of a transverse orientation of the screens, the frame elements will be connected to each other horizontally by means of spacer elements.

For support of the suspension device in the downward direction, there is preferably provided one support element for an associated frame element. Said support element is formed in the manner of the frame element and/or a spacer element, and, in together with a plurality of frame elements and spacer elements, the suspension device can be formed in a modular design. In this arrangement, the support element has a substantially rectangular outer shape when seen in front view, wherein the lengths of two mutually opposite edges substantially correspond to the shorter edge length of the image format. The lengths of the two other edges of the supporting element substantially correspond to half the difference between the length of the long image format edges and the edge length of the frame element. In other words, this means that, when seen in front view, the support element is half as large as the spacer element. The support element has the purpose, in vertically arranged screens, to support the respective lowermost frame element in the downward direction, wherein, when seen in front view, the support element connected to the frame element is fully covered by the part of the screen extending beyond the frame element. Thus, in screens to be arranged vertically, adjacent frame elements in vertical direction are connected to each other by spacer elements, and the respective lowermost spacer element is delimited downwardly by a support element. The support element can be configured e.g. for attachment to a base or to a wall.

The frame element, the spacer element and/or the support element are respectively formed by a frame profile onto which at least one precision frame is mounted, e.g. by rivets or by welding. The frame profile has the advantage that it can be produced with large manufacturing tolerances for achieving a high stability, while the precision frame can be produced e.g. as a cast component from plastic with small manufacturing tolerances. The precision frame serves for abutment of adjacent frame elements, spacer elements and/or support elements and allows for a high fitting accuracy and a small gap width of adjacent screens of the screen wall. Preferably, exactly two precision frames of identical size are provided on mutually opposite sides of the frame profile. In this arrangement, when seen in front view, the two precision frames can be arranged at such an offset relative to the frame profile that the precision frames at least on one side extend beyond the frame profile and on the opposite side are set back relative to the frame profile. This way, there is created a connection between adjacent frame profiles or between a frame element and a spacer element or support element in the manner of a tongue-and-groove arrangement, wherein the frame profile extending beyond the precision frame will be attached to a frame profile which is set back relative to the precision frame. As provided by the invention, the advantage of the suspension device resides in the fact that wide-format screens can be conveniently combined with each other into a screen wall without disturbing additional edges, notably in a precisely fitting arrangement with intervals of less than 1 and preferably a tenth of a millimeter and in precise orientation relative to each other.

Three exemplary embodiments of the invention will be explained in greater detail hereunder with reference to the Figures.

Figure 2:
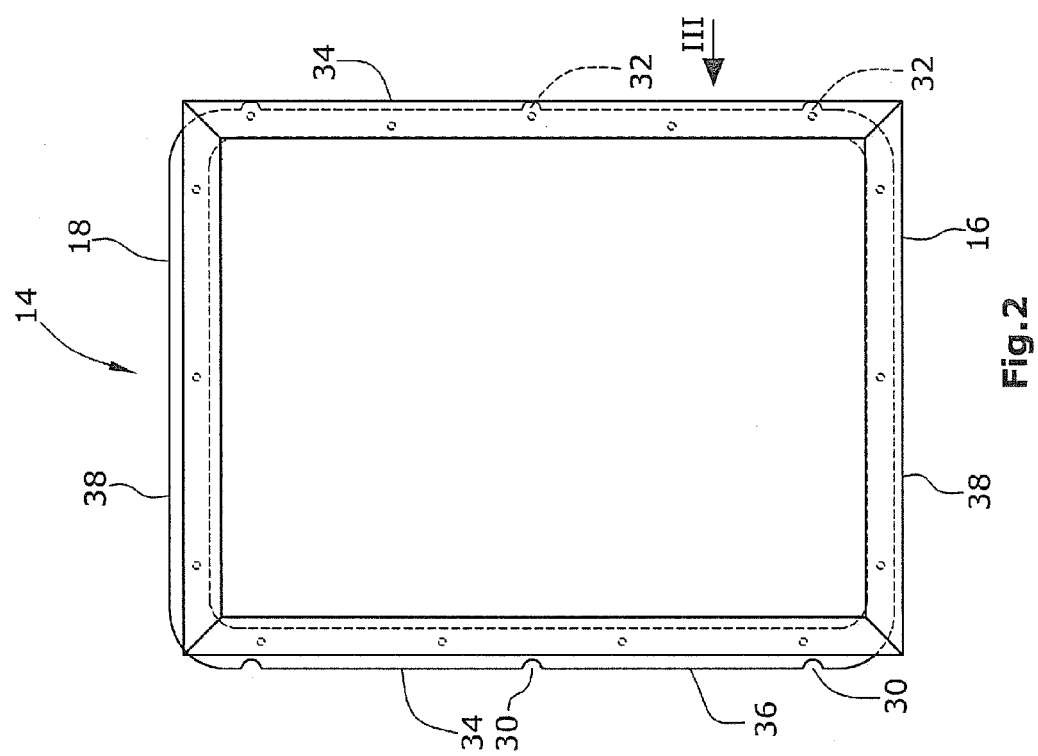
Figure 6:
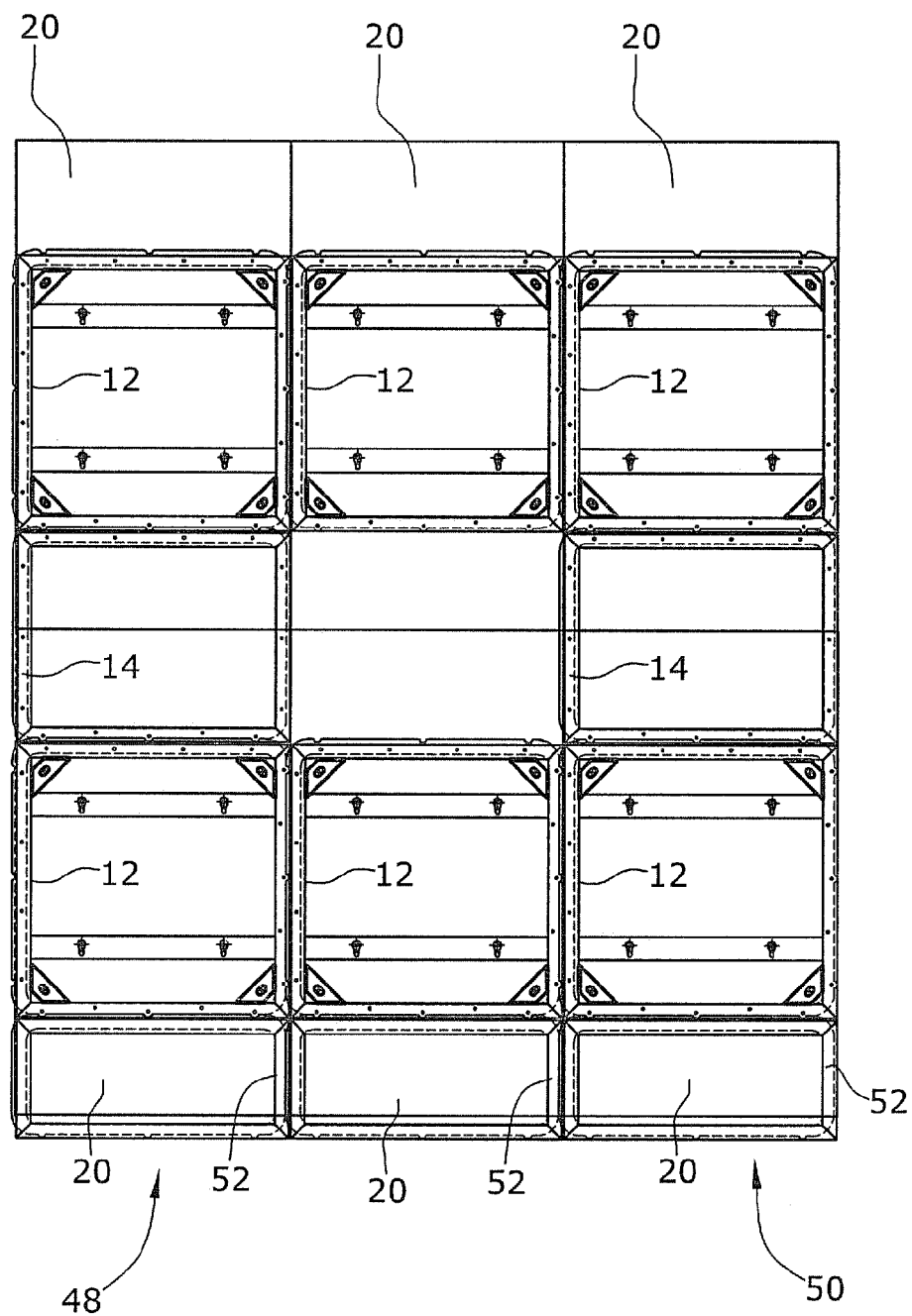
Figure 7:
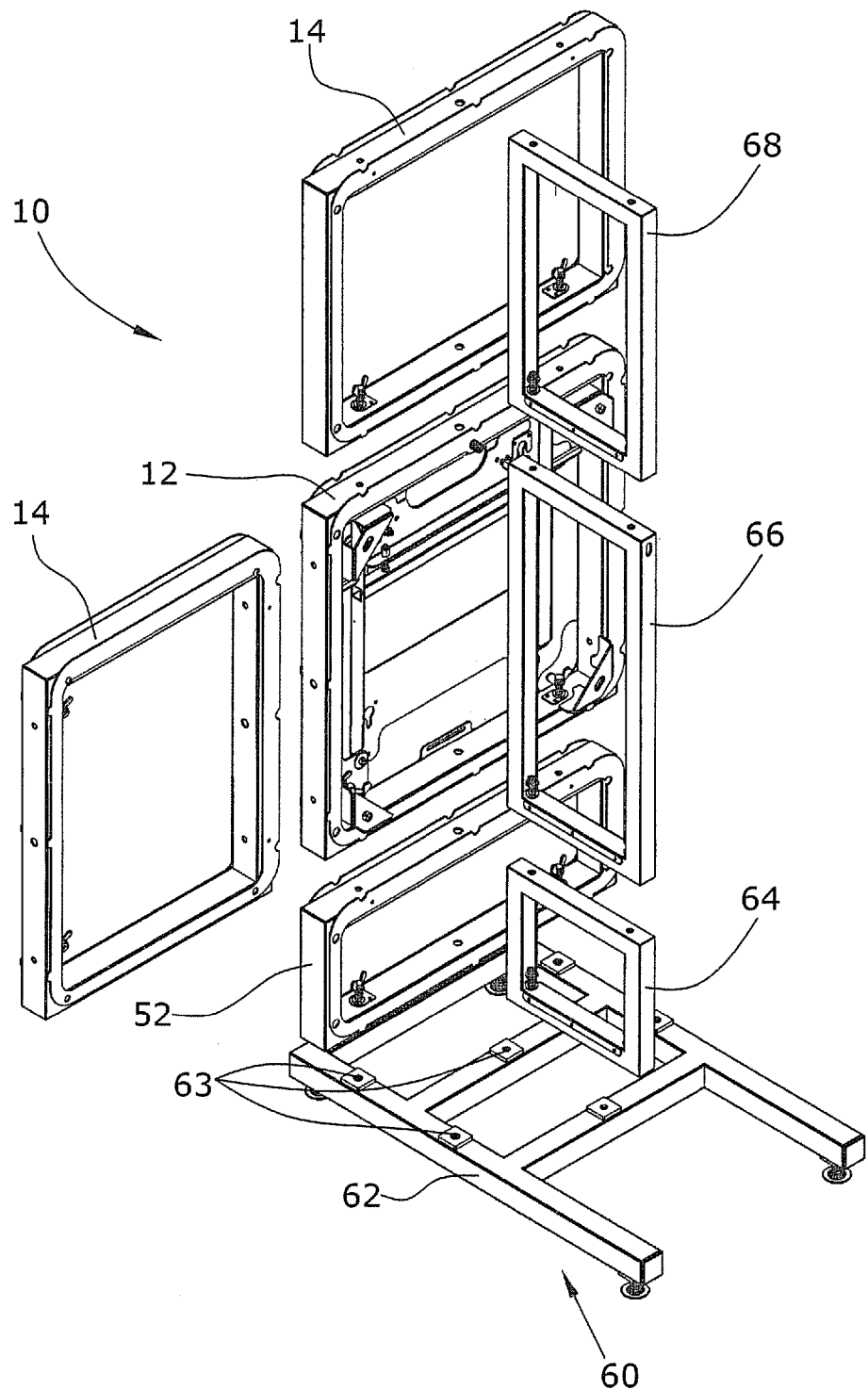

In the Figures, the following is shown:

FIG. 1 shows a frame element according to a first exemplary embodiment in front view, FIG. 2 shows a spacer element according to the first exemplary embodiment, FIG. 3 shows the spacer element according to FIG. 2 from the direction of arrow III in FIG. 2, FIG. 4 shows the suspension device with the frame element according to FIG. 1, with the spacer element according to FIG. 2 and with the suspended screen, FIG. 5 shows a second embodiment of a suspension device of a screen wall, FIG. 6 shows a third embodiment of a suspension device of a screen wall, FIG. 7 shows a fourth embodiment of a suspension device of a screen wall, and FIG. 8 shows a fifth embodiment of a suspension device of a screen wall.

The suspension device 10 according to the first embodiment as shown in FIGS. 1 to 4 comprises the frame element 12 shown in FIG. 1 and the spacer element 14 shown in FIGS. 2 and 3. Said frame element 12 and said spacer element 14 are each formed of a frame profile 16 and two precision frames 18 which, as shown in FIG. 3, are fastened to frame profile 16 on opposite sides of the latter. Each frame profile 16 is welded from conventional stable metal profiles. Each precision frame 18 is a precise one-pieced part, formed e.g. by CNC milling or laser treatment, with small tolerances of a precision in the range of a tenth of a millimeter. Each precision frame 18 is welded onto the appertaining frame profile 16. The frame profiles 16 of each frame element 12 are designed for attachment to a wall and for carrying a respective screen 20. The frame profiles 16 lend the required stability to the suspension device 10 for carrying the screens 20 and can be produced with relatively large tolerances. The precision frames 18 are produced with small manufacturing tolerances of about one millimeter and serve for exact precision adjustment of the frame elements 12, the spacer elements 14 and possible support elements relative to each other.

The frame profile 16 and the appertaining precision frames 18 are of equal sizes when seen in front view, the precision frames 18 being displaced relative to the frame profile 16 to the left and in upward direction in FIGS. 1 and 2. Thereby, the precision frames 18 in FIGS. 1 and 2 extend beyond the frame profile 16 to the left and in upward direction and are respectively set back relative to the frame profile 16 in downward direction and to the right. FIG. 3 is a lateral view of the precision frames 18 extending beyond frame profile 16 in upward direction and set back in downward direction relative to the frame profile. As a result, one side with projecting frame profiles 18 will be attached to one side with set-back precision frames 18, thus creating a tongue-and-groove-type connection between adjacent frame elements or between a frame element and a spacer element. The groove is respectively formed by the frame profile 16 set back relative to the precision frame 18, and the spring is respectively formed by the frame profile 16 projecting relative to the precision frame 18.

When seen in front view, the frame profile 16 and the precision frames 18 of a frame element 12 have a substantially square shape as evident from FIG. 1 so that also the frame element 12 has a substantially square outer shape in front view. The length of the outer edges 22 of frame element 12 is equal to the length of the shorter edge 24 of screen 20. Frame element 12 comprises four openings as receiving means 26 for screen 20. Screen 20 is on the rear side of its casing provided with corresponding pins 28 for insertion into the openings of the receiving means 26 in the horizontal and vertical orientations of screen 20. When seen in front view, the openings of receiving means 26 has a pear- or keyhole-like shape, thus creating a bayonet-like lock for engagement of pin 28. FIG. 4 shows the screen 20 hung into receiving means 26.

Each precision frame 18 is on at least one outer edge provided with deepened portions 30 and, on the respective opposite edge, with complementary projections 32 for engagement into the deepened portions 30 of an adjacent precision frame. By the engagement of the projections 32 into deepened portions 30 of an adjacent precision frame and by the mutual abutment of adjoining precision frame edges, adjacent frame elements 12 or one frame element 12 and one spacer element 14 will be precisely adjusted relative to each other.

The spacer element 14 according to FIG. 2 is configured, on two opposite sides 34 thereof, for attachment to an outer edge 22 of an adjacent frame element 12. In this regard, the deepened portions 30 of spacer element 14 engage corresponding projections 32 of frame element 12. On the opposite side, corresponding projections 32 of spacer element 14 engage respective deepened portions 30 of frame element 12. FIG. 4 shows a spacer element 14 connected to a frame element 12 in the above manner.

As shown in FIG. 2, the frame profile 16 and the precision frame 18 of each spacer element 14 each have a substantially rectangular outer shape when seen in front view so that also the spacer element 14 is rectangular in front view. The length of the longer edge 36 of spacer element 14 corresponds to the length of an outer edge 22 of frame profile 16. The length of the shorter edge 38 of spacer element 14 corresponds to the difference between the long edge 40 of screen 20 and the length of edge 22 of frame element 12. Thereby, the screen 20 hung into frame element 12 according to FIG. 4 on its side projecting beyond frame element 12 extends up to the middle of spacer element 14. In screens 20 arranged adjacent to each other in this manner, the frame elements 12 carrying the screens 20 and the spacer elements 14 connecting the frame elements 12 are fully covered by the screens 20 and are not visible in front view onto the screen wall.

Further exemplary embodiments of a screen wall 42 assembled in this manner are shown in FIGS. 5 and 6.

In the exemplary embodiment according to FIG. 5, the screens 20 are arranged transversely, i.e. horizontally. Each screen 20 is suspended on an associated frame element 12. The frame elements 12 of the uppermost row 44 and of the lowermost row 46 are connected to each other in horizontal direction by spacer elements 14. The frame elements 12 are respectively directly connected to each other in vertical direction. The suspension device 10 of the embodiment according to FIG. 5 comprises nine frame elements 12 and four spacer elements 14 for suspension of nine wide-format screens in horizontal orientation.

The exemplary embodiment according to FIG. 6 comprises a screen wall 42 assembled of screens 20 arranged upright, e.g. horizontally. Each screen 20 is carried by a frame element 12. Adjacent frame elements 12 are directly connected to each other in horizontal direction, i.e. in rows. In the vertical direction, adjacent frame elements of the two outer columns 48,50 are connected to each other by spacer elements 14. The lowermost frame elements 12 are supported in downward direction by a respective support element 52. Each support element 52 is composed of a frame profile 16, not shown, and corresponding precision frames 18, with the size of each support element 52 corresponding exactly to half the size of a spacer element 14. Thereby, the support elements which respectively are connected only to one frame element 12 arranged thereabove, are fully covered by the up-right-suspended screens 20 in front view. The support elements 52 serve for attachment of the screen wall e.g. on bases, not shown. Each support element 52, when seen in front view, has a substantially rectangular shape, wherein the length of the longer support element edge corresponds to the length of the edge of a frame element 12. The length of the shorter support element edge corresponds to half the length of a spacer element 14.

Each frame element 12 has fastening means 54 comprising four support brackets designed to be screwed to a holding wall or to a stand.

FIG. 7 shows a variant of a suspension device 10 according to the invention supported and carried by a stand 60. Said stand 60 has a base foot 62 configured for resting on the ground. Base foot 62 is provided with receiving means 63 in the form of holes for selective insertion of a support element 52, a frame element 12, a spacer element 14 and/or stand elements 64,66, 68 in various combinations. In FIG. 7, a support element 52 is inserted into two receiving means 63 of the base foot 62, and a support-element stand element 64 is inserted into further receiving means 63 in such a manner that said support-element stand element 64 supports the support element 52 and transmits the static forces thereof to the base foot 62. Mounted on the stand element 64 is a stand element 66 for a frame element 12. The frame element 12 is connected to the support element 52 and supported thereby in the usual manner, and the stand element 66 is connected to the stand element 64 and to the frame element 12 such that the stand element 66 supports the frame element 12 and the stand elements 66,64 transmit the static forces of frame element 12 to the base foot 62. In a corresponding manner, a stand element 68 for a spacer element 14 is connected to stand element 66 so that the stand element 68 takes up static forces of a further stand element 66—not shown in FIG. 7—arranged thereabove and, via the stand elements 64,66 therebelow, transmits these forces to base foot 62. In regard to their size, the stand elements 64,66,68 are adapted to a support element 52, a frame element 12 and a spacer element 14, respectively, and can be connected in various positions relative to each other and to the base foot 62 so to form a stand 60, thus allowing for flexible and individual construction of a screen wall.

FIG. 8 shows a variant of the invention wherein the whole screen wall is suspended on a ceiling a support structure by a suspension means 70 without providing a downward support relative to the ground. The suspension means 70 is formed, for a screen wall assembled from three screens, by three suspension brackets 72 which are connected to the frame elements 12 of the three uppermost screens. Each suspension bracket 72 is provided with an eye 78 having a suspension rope attached to it. Further, each suspension bracket 72 comprises a support bracket 79 projecting vertically to a plane of the screen wall, said support bracket being designed for connection to a vertical stand element 66 for a frame element 12. In this manner, the three screens of each column of the screen wall in FIG. 8 which are arranged vertically above each other are supported and reinforced by inter-connected stand elements 66, wherein the respective lowermost stand element 66 is connected to a horizontal stand element 74 in a T-shaped configuration. Each horizontal stand element 74 in turn is connected to the lower edge of the lowermost frame element 12. The horizontal stand elements 74 are respectively connected to each other by a further stand element 76 which has a size corresponding to the spacer elements 14 between the frame elements 12 and which is connected to a respective one of the spacer elements. This way, there is created a suspension means 70 for a screen wall that is reinforcing both in the horizontal direction and the vertical direction and makes it possible to freely suspend the screen wall in a stabilized manner.

The invention claimed is:

1. A screen wall comprising:
  at least two substantially rectangular screens, each screen having a short screen length and a long screen length that define a front display surface and a back connection surface; and
  a suspension device connecting the at least two substantially rectangular screens to each other within a first connection plane, the suspension device having, for each screen:
    at least one substantially square frame element having with a square frame length that is substantially equal to the short screen length;

at least one screen receiving means connecting the back connection surface of each screen to the suspension device within the first connection plane; and at least one substantially rectangular spacer element having a short spacer length and a long spacer length that define two mutually opposite edges configured for attachment to an outer edge of the at least one substantially square frame element within a second connection plane transverse to the first connection plane, wherein the long spacer length is substantially equal to the square frame length and the short spacer length is substantially equal to half the difference of the long screen length minus the square frame length.

2. The screen wall according to claim 1, wherein at least one outer edge of each of the at least one substantially square frame element is configured for attachment to at least one further identical frame element.

3. The screen wall according to claim 1, wherein the at least one substantially square frame element further comprises a fastener configured for attachment to a wall or a holder.

4. The screen wall according to claim 1, wherein the at least one screen receiving means further comprises a first fastener and a second fastener, the first fastener being configured to establish a releasable plug-in connection with the second fastener at the back connection surface.

5. The screen wall according to claim 1, wherein each screen receiving means is configured to hold one of the at least two substantially rectangular screens in either a horizontal or vertical orientation.

6. The screen wall according to claim 1, wherein the suspension device further comprises a substantially rectangular support element having a short support length and a long support length, and wherein the short support length is substantially equal to half the difference of the long screen length minus the square frame length and the long support length is substantially equal to the long spacer length.

7. The screen wall according to claim 6, wherein each of the at least one substantially square frame element, the substantially rectangular spacer element, and the substantially rectangular support element further comprise a stabile frame profile with at least one precision frame mounted on the stabile frame profile.

8. The screen wall according to claim 7, wherein the stabile frame profile and the at least one precision frame each have a substantially rectangular outer shape with an equal edge length, and wherein the precision frame is offset relative to the frame profile so that one edge of the precision frame extends beyond an edge of the frame profile while an opposite edge of the precision frame is set back relative to the frame profile.

9. The screen wall according to claim 1, wherein the suspension device further comprises a stand having at least one base foot and a stand element carried by the base foot, with the base foot and the stand element being arranged to support the at least one substantially square frame element, the substantially rectangular spacer element, and the substantially rectangular support element.

10. The screen wall according to claim 9, wherein the suspension device further comprises a suspension means including at least one suspension bracket for suspension of the suspension device, and wherein at least one stand element is configured to support and reinforce the suspension device when suspended.

11. A screen wall comprising:

at least two substantially rectangular screens, each screen having a short screen length and a long screen length that define a front display surface and a back connection surface; and a suspension device connecting the at least two substantially rectangular screens to each other within a first connection plane, the suspension device having, for each screen:

at least one substantially square frame element with an outer edge having a square frame length that is substantially equal to the short screen length within the first connection plane;

at least one screen receiver connecting the back connection surface of each screen to the suspension device within the first connection plane; and at least one substantially rectangular spacer element having a short spacer length and long spacer length that define two mutually opposite edges rigidly attached to the at least one substantially square frame element within a second connection plane transverse to the first connection plane, wherein an outer perimeter of the at least two screens surrounds the at least one substantially square frame element when viewed through the first connection plane;

wherein the long spacer length is substantially equal to the square frame length and the short spacer length is substantially equal to half the difference of the long screen length minus the square frame length.

12. The screen wall according to claim 11, wherein the at least one substantially square frame element further comprises a fastener configured for attachment to a wall or a holder.

13. The screen wall according to claim 12, further comprising a substantially rectangular support element, wherein each of the at least one substantially square frame element, the substantially rectangular spacer element, and the substantially rectangular support element further comprise a stabile frame profile with at least one precision frame mounted on the stabile frame profile.

14. The screen wall according to claim 13, wherein the stabile frame profile and the at least one precision frame each have a substantially rectangular outer shape with an equal edge length, and wherein the precision frame is offset relative to the frame profile so that one edge of the precision frame extends beyond an edge of the frame profile while an opposite edge of the precision frame is set back relative to the frame profile.

15. The screen wall according to claim 11, wherein the suspension device further comprises a stand having at least one base foot and a stand element carried by the base foot, with the base foot and the stand element being arranged to support the at least one substantially square frame element, the substantially rectangular spacer element, and the substantially rectangular support element.

16. The screen wall according to claim 15, wherein the suspension device further comprises a suspension means including at least one suspension bracket for suspension of the suspension device, and wherein at least one stand element is configured to support and reinforce the suspension device when suspended.

17. A screen wall comprising:

at least two substantially rectangular screens, each screen having a short screen length and a long screen length that define a front display surface and a back connection surface; and a suspension device connecting the at least two substantially rectangular screens to each other within a first connection plane, the suspension device having, for each screen:
  at least one substantially square frame element with an outer edge having a square frame length that is substantially equal to the short screen length within the first connection plane;
  at least one screen receiving means for connecting the back connection surface of each screen to the suspension device within the first connection plane; and
  at least one substantially rectangular spacer element having a short spacer length and long spacer length that define two pairs of mutually opposite edges within a second connection plane transverse to the first connection plane,
wherein the at least two screens cover the entirety of the at least one substantially square frame element within the first connection plane; wherein the long spacer length is substantially equal to the square frame length and the short spacer length is substantially equal to half the difference of the long screen length minus the square frame length.

18. The screen wall according to claim 17, wherein the at least one substantially square frame element further comprises a fastening means for attachment to a wall or a holder.

19. The screen wall according to claim 18, further comprising a substantially rectangular support element, wherein each of the at least one substantially square frame element, the substantially rectangular spacer element, and the substantially rectangular support element further comprise a stabile frame profile with at least one precision frame mounted on the stabile frame profile.

20. The screen wall according to claim 19, wherein the stabile frame profile and the at least one precision frame each have a substantially rectangular outer shape with an equal edge length, and wherein the precision frame is offset relative to the frame profile so that one edge of the precision frame extends beyond an edge of the frame profile while an opposite edge of the precision frame is set back relative to the frame profile.

21. The screen wall according to claim 17, wherein the suspension device further comprises a stand having at least one base foot and a stand element carried by the base foot, with the base foot and the stand element being arranged to support the at least one substantially square frame element, the substantially rectangular spacer element, and the substantially rectangular support element.

* * * * *